M. PETERSEN.
CHRONOMETER-ESCAPEMENT FOR WATCHES.
No. 172,165. Patented Jan. 11, 1876.
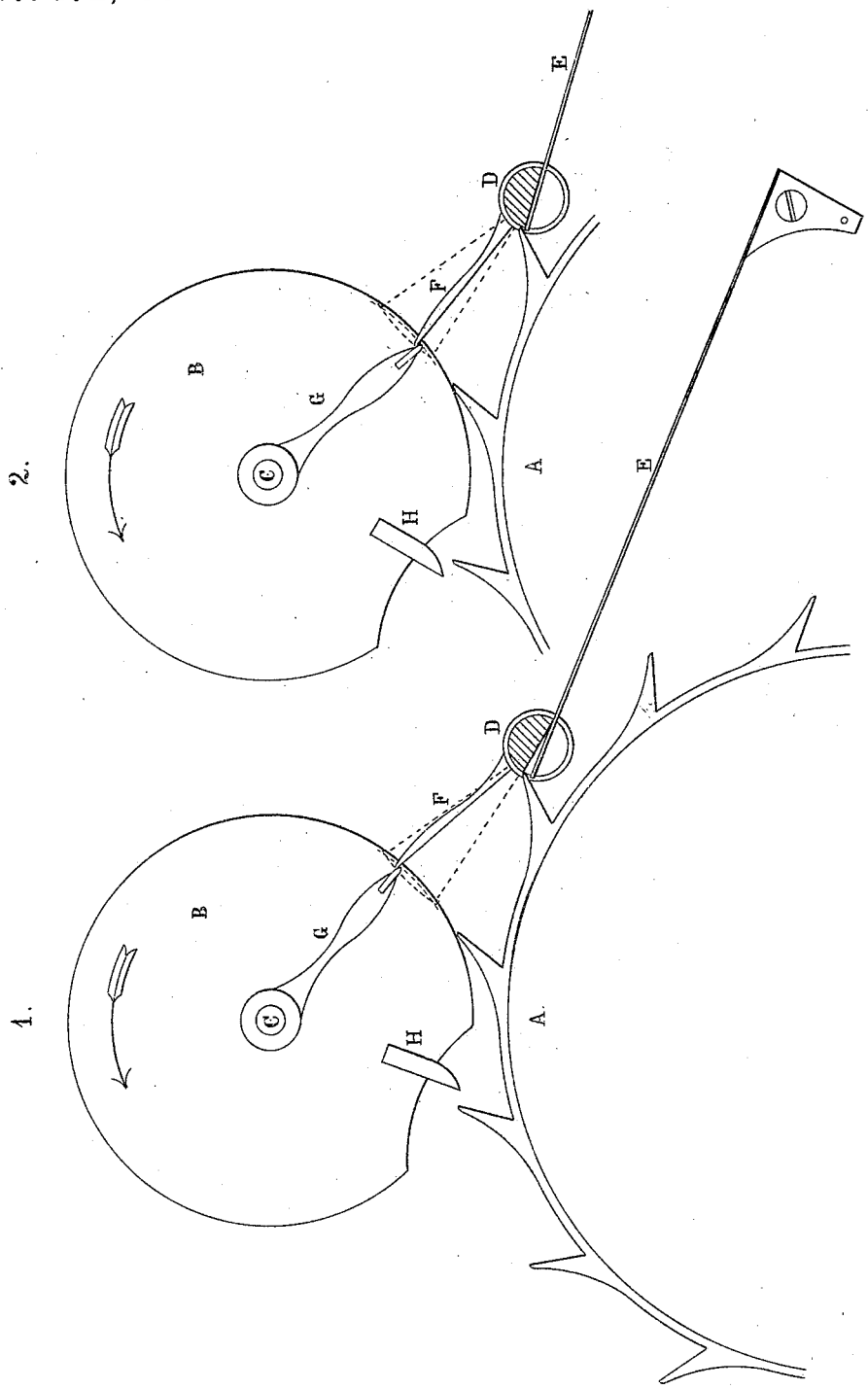

UNITED STATES PATENT OFFICE.

MATHIAS PETERSEN, OF ALTONA, PRUSSIA.

IMPROVEMENT IN CHRONOMETER-ESCAPEMENTS FOR WATCHES.

Specification forming part of Letters Patent No. 172,165, dated January 11, 1876; application filed April 3, 1875.

*To all whom it may concern:*

Be it known that I, MATHIAS PETERSEN, of Altona, Prussia, have invented an Improvement in Chronometer-Escapements, of which the following is a specification:

This invention relates to an improvement in chronometer-escapements; and has for its object to make these mechanisms simpler in design, more certain in their action, and less liable to derangement.

This escapement is represented on the annexed sheet of drawings.

A is the escape-wheel; B, the impulse-disk, connected to the balance, both not differing from the ordinary detent-escapement. C is the axis of the balance; D, the locking-cylinder, oscillating on two pivots. The same is flattened on one side down to its center, so that the spring E, bearing on the flattened surface, will cause the cylinder to remain in a certain position at rest so long as no other parts of the mechanism cause a deviation from this position. F is a lever, fastened to the cylinder D; and G, a similar, very thin, lever, fixed to the axis of the balance. Both levers are so arranged in height and length as to come in contact with each other when passing the line of centers C D.

The action of this escapement is as follows: So long as the locking-cylinder D is at rest in its normal position, as in Fig. 2, a tooth of the escape-wheel rests on the round part of the same, this wheel being thereby locked, while the balance is free to swing. The latter moving in the direction of the arrow, the end of the lever G touches the lever F and moves it over a certain angle, as shown in both figures, so as slightly to turn the cylinder D, the tooth of the escape-wheel being thereby liberated, and allowed to pass in front of the flattened surface of the cylinder. At the same moment the next tooth engages with the part H of the disk B, and gives a new impulse to the latter, as in other escapements of the kind. As soon as the lever G has released the lever F the cylinder D returns to its normal position by means of the spring E, so as to again arrest the movement of the escape-wheel. On the return motion of the balance the lever G strikes the lever F from the back, and thereby causes the cylinder to oscillate slightly in a direction contrary to the former; but this has no influence on the position of the escape-wheel, and the cylinder reassumes its normal position, by means of the spring E, as soon as the lever F is again released from G. The teeth of the escape-wheel being locked by the outer surface of a cylinder, no recoil of the wheel can take place by the motion of this cylinder.

The acting extremity of the lever G may be provided with a ruby; or the lever may be replaced altogether by a ruby-pin, inserted into a hole in the impulse-disk or in one arm of the balance. The locking part of the cylinder may also be jeweled in a convenient manner. I prefer to do this by drilling a hole of the size of the locking-cylinder into a piece of steel wire for a certain part of its length, turning a pivot to it at the solid end, and hardening and finishing it. A half-flattened ruby cylinder of proper size is then cemented into the hollow, and a certain part of the cylindrical steel shell taken away, so as to expose the flat surface and the locking-face to the required extent. An upper pivot is finally fixed into the cylinder, in the way commonly employed in the horizontal escapement.

The advantages of this escapement, which I have termed "German Chronometer-Escapement," are the following: First, the parts of the same are less liable to breakage, in comparison to the detent-escapement, and it does not require so high a degree of accuracy in workmanship to insure the possibility of a perfect adjustment. Second, the manufacture of the escapement is placed within the range of machine-work, and, in case of repair, it is less liable to be spoiled in the hands of an artisan of inferior skill. Third, the unlocking resistance is reduced to the mere amount of friction, as the wheel is locked by a cylindrical surface, while hitherto the draw or inclination of the locking-face was considered indispensable in all detached or free escapements. Fourth, there is no necessity for oiling the locking-face. Fifth, the escapement is absolutely safe from disturbances by external shocks, even if they be violent. Sixth, the unlocking-lever G may be made much larger than in the detent-escapement; its angle of unlocking can, therefore, be considerably reduced with the same certainty of action, thus essentially diminishing the liability of the chronometer to set or to be stopped. Seventh, the manufacture of this escapement does not involve a higher expense than that of a good lever-escapement. Eighth, any detent or other chronometer escapement can easily be converted into the "German Chronometer-Escapement" by substituting the locking-cylinder for the detent-spring, especially in case a detent is spoiled.

The most material are the points 4, 5, and 6, and these alone involve a decided superiority of the "German Chronometer-Escapement" over others, especially for portable timekeepers.

I claim as my invention—

1. The combination of the detaching-lever G and projecting lever F with the cylinder D, by which the escape-wheel A is released, constructed and arranged substantially as and for the purposes specified.

2. The cylinder D, spring E, levers F and G, and escape-wheel A, combined and arranged substantially in the manner and for the purposes herein set forth.

In testimony whereof I have signed my name to this specification in the presence of two subscribing witnesses.

Altona, the 9th February, 1875.

MATHIAS PETERSEN.

Witnesses:
CHRISTIAN HENNINGS,
HEINRICH GULTSCH.